United States Patent [19]
Harrison et al.

[11] Patent Number: 5,701,482
[45] Date of Patent: Dec. 23, 1997

[54] MODULAR ARRAY PROCESSOR ARCHITECTURE HAVING A PLURALITY OF INTERCONNECTED LOAD-BALANCED PARALLEL PROCESSING NODES

[75] Inventors: R. Loyd Harrison, Fullerton; Steven P. Davies, Ontario, both of Calif.

[73] Assignee: Hughes Aircraft Company, Los Angeles, Calif.

[21] Appl. No.: 553,963

[22] Filed: Nov. 6, 1995

Related U.S. Application Data

[63] Continuation of Ser. No. 116,432, Sep. 3, 1993, abandoned.
[51] Int. Cl.$^6$ .............................. G06F 15/16; G06F 9/40
[52] U.S. Cl. .................... 395/675; 395/800; 395/670; 395/672; 364/281.3; 364/281
[58] Field of Search ................................ 395/800, 670, 395/672, 675, 674; 364/DIG. 1

[56] References Cited

U.S. PATENT DOCUMENTS

| | | | |
|---|---|---|---|
| 4,577,272 | 3/1986 | Ballew et al. | 364/DIG. 1 |
| 4,654,654 | 3/1987 | Butler et al. | 340/825.5 |
| 4,839,798 | 6/1989 | Eguchi et al. | 364/DIG. 1 |
| 5,031,089 | 7/1991 | Liu et al. | 364/DIG. 1 |
| 5,155,858 | 10/1992 | DeBruler et al. | 395/800 |
| 5,283,897 | 2/1994 | Georgiadis et al. | 395/650 |
| 5,357,632 | 10/1994 | Pian et al. | 395/650 |
| 5,392,429 | 2/1995 | Agrawal et al. | 364/735 |
| 5,459,864 | 10/1995 | Brent et al. | 395/675 |

OTHER PUBLICATIONS

Xu et al., "Dynamic Load Balancing for Parallel Program Execution on a Message–Passing Multicomputer", IEEE, Dec. 1990, pp. 402–406.

Sarje et al., "Heuristic model for task allocation in distributed computer systems", IEE Proceedings, Sep. 1991, pp. 313–318.

*Primary Examiner*—Alyssa H. Bowler
*Assistant Examiner*—Walter D. Davis
*Attorney, Agent, or Firm*—G. S. Grunebach; M. W. Sales; W. Kay Denson-Low

[57] ABSTRACT

A modular array processor architecture (10) comprising a plurality of interconnected parallel processing node (11)s that each comprise a control processor (12), an arithmetic processor (13) having an input port (22) for receiving data from an external source that is to be processed, a node memory (14) that also comprises a portion of a distributed global memory, and a network interface (15) coupled between the control processor (12), the arithmetic processor (13), and the node memory (14). Data and control buses (17, 18) are coupled between the arithmetic processors (13) and network interfaces (14) of each of the processing nodes (11). Respective network interfaces (15) link each of the arithmetic processors (13), node memories (14) and control processors (12) together to provide for communication throughout the architecture (10) and permit each node to communicate with the node memories (14) of all other processing nodes (11). This linking, along with the use of a heuristic scheduling algorithm, provides for load balancing between the processing nodes (11). Data queues are segmented and distributed across the architecture (10) in a way that the source and destination nodes (11) process data locally in the memory (14), while overflow is kept in distributed bulk memories (14). The network interfaces (15) buffer data transferred over the data and control buses (17, 18) to a respective node (11). Also, the network interfaces (15) operate as high-speed DMA controllers to transfer data between the arithmetic processor (13) and node memory (14) of a processing node (11) independent of the operation of the control processor (12) in that node (11). The control bus (17) is used to keep track of available resources throughout the architecture (10) under control of a heuristic scheduling algorithm that reallocates tasks to available arithmetic processors (13) based on a set of heuristic rules to achieve the load balancing. The data bus (18) is used to transfer data between the node memories (14) so that reallocated tasks are performed by selected arithmetic and control processors (13, 12) using data that is stored locally.

7 Claims, 3 Drawing Sheets

MODULAR ARRAY PROCESSOR ARCHITECTURE HAVING A PLURALITY OF INTERCONNECTED LOAD-BALANCED PARALLEL PROCESSING NODES

This is a continuation application Ser. No. 08/116,432, filed Sep. 3, 1993, now abandoned.

BACKGROUND

The present invention relates to array processors, and more particularly, to a modular array processor architecture that provides for distributed parallel processing and that comprises multiple parallel processing nodes having access to a distributed global memory by way of multiple buses.

There are many ways to process data flow graphs on a multi-processor system in which nodes and tasks are assigned for processing. One prior method statically allocates tasks to specific processors prior to run-time system execution, either manually or by use of complicated software tools. This static pre-assignment is inflexible and often achieves less than satisfactory results. The disadvantage is that, if a change in operating modes occurs, the system cannot adapt and time-line processing is corrupted. Processing assignments must be redone to correct the situation, requiring a system to be halted while reassignments are made and then restarted.

Another prior method of allocating nodes and processing tasks is dynamic data flow. This method selects a processor to perform the work at every executable point. Tasks are dynamically assigned to processors with no predetermined flow. Although this method is highly adaptive, decisions must be made over and over, consuming enormous computer resources to schedule tasks and to manage memory.

The architecture disclosed in U.S. Pat. No. 4,972,314, entitled "Data Flow Signal Processor Method and Apparatus" assigned to the assignee of the present invention, as well as the well-known EMSP architecture developed by AT&T, are examples of data flow architectures utilizing a central global memory and a scheduler. In these types of architectures, there is a need for a high speed memory manager, a high speed scheduler, and a large data transfer network to support large configurations. These processing elements become bottlenecks in large configurations and are burdensome overhead in small configurations that limit the practical modularity of the system. The processing elements also pose a reliability problem as they make the overall system susceptible to single point failures due to large centralized functions.

Current spectral processing techniques require large data batches to obtain sufficient doppler resolution. Often, because of low sample rates, multiple signal channels can be processed simultaneously to maximize performance. The combination of multichannel processing and large data batch sizes is processor memory intensive, not only in terms of raw storage capacity, but in terms of data batch routing and accessibility. This requires high throughput, high data bandwidth, and large memory size in the signal processor system.

The implementation of signal processing algorithms is ideally suited to a data flow methodology because the nature of the processing sequences and the inherent parallelism in the algorithms are easily described using data flow graphs. The U.S. Navy's processing graph methodology is a mechanism by which the data flow architecture is realized. The processing graph methodology permits design engineers to describe signal processing algorithms graphically, using a standard notation designed specifically for that purpose. The use of this approach yields programs that are easily understood and maintained because they map directly into the design engineer's problem space. This results in significant reductions in software costs because programs are more easily maintained, and algorithms are more easily adapted to continually changing threat environments.

Using the processing graph methodology to describe signal processing solutions isolates the application algorithms from the low level details of a particular implementation. This further reduces software costs because algorithms become portable between various systems and configurations.

Accordingly, it is an objective of the present invention to provide a signal processing architecture that provides for access to a distributed global memory by multiple parallel processing nodes. It is a further objective of the present invention to provide a signal processing architecture that implements load balancing between parallel processing nodes in a distributed parallel processing system with distributed management and storage of data queues across distributed memories of the system.

SUMMARY OF THE INVENTION

To achieve the above objectives, the present invention comprises a modular array processor architecture that includes a plurality of interconnected parallel processing nodes. Each processing node has one or more control processors, one or more arithmetic processors having an input port for receiving data from an external source that is to be processed, a node memory that also comprises a portion of a distributed global memory, and a network interface coupled between the control processor, the arithmetic processors and the node memory. Data and control buses are coupled between the respective arithmetic processors and network interfaces of each of the processing nodes.

The network interfaces link the respective arithmetic processors, node memories and control processors together to provide for communication throughout the architecture and permit each node to communicate with the node memories of all other processing nodes. This is used in conjunction with a heuristic scheduler to balance the processing load between the processing nodes. The network interfaces buffer data transferred over the data and control buses to a respective node. Also, the network interfaces operate as high-speed DMA controllers to transfer data between the arithmetic processors and node memory of a processing node independent of the operation of the control processor in that node.

The control bus keeps track of available resources throughout the architecture under control of the heuristic scheduler that reallocates tasks to available processors based on a set of heuristic rules. The data bus is used to transfer data between the node memories so that reallocated tasks are performed by selected arithmetic and control processors using data that is stored locally.

The modular array processor architecture includes an adaptive node scheduling system that takes advantage of the cyclic nature of signal processing applications to achieve the performance of a dynamic data flow architecture with an overhead closer to that of a statically-oriented processing system. Processing tasks are distributed by node group at start time. Then, during run time an idle arithmetic processor can receive work from a busy arithmetic processor under adaptive control by selection and assignment move algorithms that are part of the heuristic scheduler. Thus, the architecture dynamically adapts itself to provide optimum time-line balancing. Distributed queue management allows every node to produce data in its own local memory, transferring that data directly to the receiving processor, or, if that processor already has sufficient data for that queue as an input, to the bulk memory controlled by the receiving processor's control processor. This unique segmented data queue approach maximizes the availability of data locally to the affected processors without overloading their local memories. The architecture is much more flexible than conventional statically allocated architectures but does not require the enormous resources for scheduling and memory management of the conventional dynamically allocated system.

More specifically, the modular array processor architecture of the present invention is a signal processing network architecture that provides adaptive node scheduling, distributed processing and distributed memory capability to support processing of data flow graphs. The signal processing network architecture is comprised of an array of processing nodes, with each node utilizing one or more arithmetic processors, one or more control processors, an expandable bulk memory, a network interface module, and optional application-specific interface modules. The scheduling and processing allocation strategy used in the present invention provides dynamic adaptation of a workload to balance the time-line loading between the processors and optimize the management of queue data across the available memories.

The present modular array processor architecture is built around a group of processing nodes interconnected by a pair of high speed buses, the data bus and the control bus. The basic processing node is designed around the well-known VME standard, meaning that processors may be upgraded, additional processors inserted, memory expanded, and input/output devices added without redesigning any of the existing hardware.

The modular array processor architecture achieves a high processing bandwidth by dividing the work among multiple processors, each performing a portion of the total processing workload. This architecture is a multiple-instruction, multiple-data (MIMD) architecture, where each processor has local program control so that each processor can perform a different operation at the same time. The modular array processor architecture executive is designed to manage many tasks or processes concurrently, with the various resources in the network shared between the various tasks or processes, and thus it provides for multi-task processing.

Inter-processor communication is achieved through the distributed global memory. High memory bandwidth is achieved by distributing the global memory, with a portion of the memory in each processing node. This has several important advantages. First, memory management bottlenecks are reduced because each control processor only needs to manage one portion of global memory. As nodes are added, global memory is added, and the added processor does the memory management for that portion of the global memory. Without this distribution strategy, memory management would become a bottleneck in large network configurations. Second, system bus requirements are reduced because a large percentage of accesses to any one portion of global memory are made by the control processor or arithmetic processor in that node. These local accesses are done over local buses without adding to the traffic on the system-wide buses. Part of the global memory management scheme is to move data in global memory to the node where that data is used.

The modular array processor architecture employs a heuristic scheduler comprising a heuristic, adaptive node scheduling algorithm that takes advantage of the cyclic nature of signal processing applications to minimize the amount of processing necessary for resource allocation and task scheduling. This translates to dynamic resource management without the overhead normally associated with conventional dynamic resource management.

In each processing node the arithmetic processors perform vector processing and manage temporary variables (transient queues) while the control processors perform scalar processing and manage permanent variables (history and complex queues). Each processor maintains lists of tasks to execute and resources to manage. Communications between processors are handled through direct memory access (DMA) transfers and input/output (I/O) interrupts. Consequently, all the processors in a node can work at the same time and the negative effects of latency in interprocessor communications is minimized.

As processors produce output, they write the data onto the tail of the output data queues within their own local data memories. If the successor task is also in that processor, the data is instantly available for that task to execute. If the task is in another processor, data is offered to that processor, which accepts data until it has sufficient for execution to begin. Any additional data is buffered within the destination control processor's bulk memory, which then provides data to its arithmetic processor as space becomes available in its local data memory. This segmented queue system facilitates task transfer, as all queue data is rerouted automatically through a queue "unwinding" process that ensures that all data is processed in the proper order, even though it may be distributed throughout memories in the system.

The adaptive task scheduling scheme used for adaptive data flow balancing is one of the main advantages of the present architecture. Tasks to be performed are divided up and each processing node is assigned a group of tasks. If the groups of tasks between nodes are not balanced, some processors will be idle at times when others are overloaded. This condition is detected and some tasks are redistributed from the overloaded processors to the idle processors, with the result that the time-line balance between processors approaches an optimum solution.

Another advantage of the modular array processor architecture is that processing and scheduling capability grows linearly with additional nodes. This is because each node contains its own memory and arithmetic and control processors. This allows efficient tailoring of processor configurations to application requirements. Coupled with the adaptive load balancing scheme, this design feature allows signal processing graph application software to stay the same as processing nodes are added.

Each processing node schedules its own work and manages its own memory. Free-standing software capability allows an arithmetic processor to schedule much of its own work without the necessity of an outside scheduler. Thus, task scheduling and arithmetic processor-to-arithmetic processor processing is accomplished without involving a control processor. Control processors handle dynamic reconfiguration and queue overflow buffering without using valuable arithmetic processor cycles to do this overhead work.

The network interface module is a unique feature of the modular array processor architecture that provides system versatility not normally part of a network processing system. The network interface module links the various arithmetic processors, node memories and control processors together, enabling communications throughout the network system without intermediaries. Each processing node can independently access buses as if they were dedicated, accessing both bulk memories and local arithmetic processor data memories as if they were local.

A key feature of the modular array processor architecture is the efficiency with which networks of nodes may be constructed to meet application processing requirements. For example, front-end input signal conditioning requires much more throughput processing power than thresholding. The modular array processor architecture allows nodes to contain multiple arithmetic processors that can handle this processing requirement. This extremely flexible capability supports such specially equipped nodes with fully compatible node scheduling.

Another important feature of the modular array processor architecture is its capability to execute Navy-standard processing graph methodology, allowing applications to be represented through signal processing graphs and command programs. The processing graph methodology is a signal processing macro data flow methodology, previously known as ECOS/ACOS, that elevates the abstraction level at which applications are developed, thus relieving the application programmer of the details of operation on the target hardware. Application programs are characterized as a set of directed data flow graphs, that form the major portion of the application software. Control of these processing graphs and user interfacing is provided through command programs.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
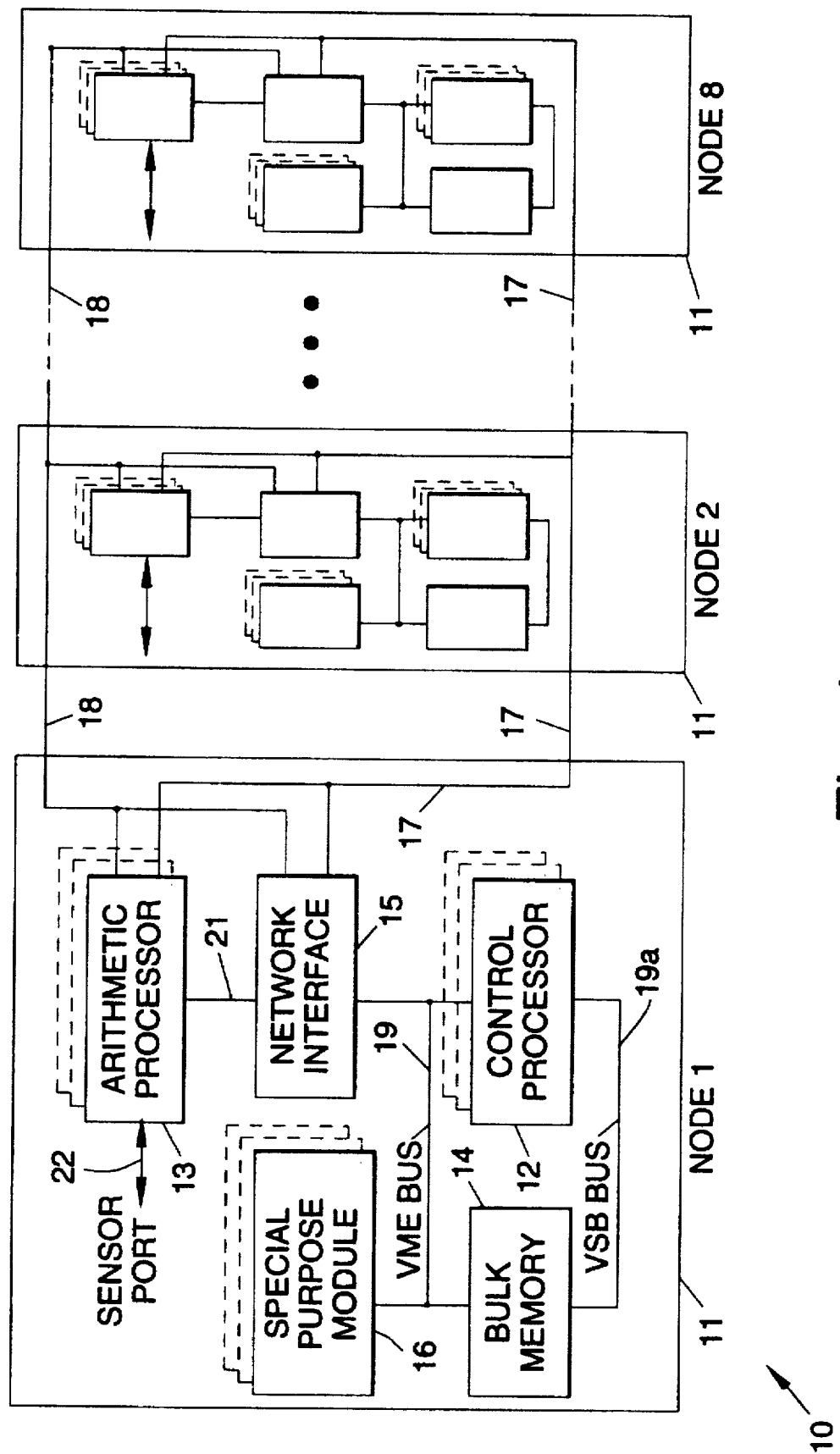
FIG. 1 illustrates a block diagram of an embodiment of a modular array processor architecture in accordance with the principles of the present invention.

Referring to the drawing figures, FIG. 1 is a block diagram of one embodiment of a modular array processor architecture 10 in accordance with the principles of the present invention. The present architecture 10 is a multiple-instruction, multiple-data (MIMD) architecture, with multiple scalar (arithmetic) and vector (control) processors 12, 13 interconnected through a distributed global memory 14 and high-speed data and control buses 17, 18. A reduced-to-practice hardware implementation of this architecture achieves digital signal processing performance in the range from 60 to 480 MFLOPS (million floating point operations per second).

Several layers of hierarchy exist in the architecture 10 shown in FIG. 1. The fundamental element of the architecture 10 is a processing node 11. Each processing node 11 is comprised of a control processor 12, an arithmetic processor 13, a node memory 14, a network interface 15, and optional special purpose interface modules 16, as required, such as an Ethernet module 16, for a particular application as shown in FIG. 1. The modular array processor architecture 10 may be populated with from one to eight processing nodes 11 that are interconnected using a pair of data and control buses 17, 18. The arithmetic processor 13 is also connected to the network interface 15 by a local bus 21 to provide contention-free access between the arithmetic processor 13 and the other components of the processing node 11.

A key aspect of the architecture 10 is its use of commercially available modules, following the industry-standard VME protocol, rather than requiring custom-built processing engines, as is typical with high performance signal processing architectures. Only the network interface 15 module is unique to the modular array processor implementation.

All buses 17, 18, 21 use a protocol optimized for high-speed packetized DMA transfers. The buses of the implemented embodiment operate at a rate of 15 MByte per second each. The buses 17, 18, 21 provide for built-in error detection and automatic retransmission to provide reliable operation even in harsh environments. The network interface 15 buffers the data transferred over the buses 17, 18, 21 and operates as a high-speed DMA controller to transfer data between the network interface 15 and the node memory 14 independent of the operation of the control processor 12. A direct 16-bit input/output (sensor) port 22 is also provided in each arithmetic processor 13 to support high-speed (currently up to 15 MBytes per second) data transfers. The input/output port 22 may be used for external input and output to sensors, for example, or may be used to connect two modular array processors for applications requiting more than a single processor system.

An executive program running in each of the processing nodes 11 manages communications between arithmetic and control processors 12, 13, provides dynamic memory management, and controls the scheduling of tasks to maintain a balance in processor loading. The distributed nature of the modular array processor architecture 10 allows performance to increase linearly as nodes 11 are added, without encountering bottlenecks that limit the performance of the system. A key feature in this distributed architecture is that the node memory 14 is available to the local node 11 and also serves as a portion of the global memory. All arithmetic and control processors 13, 12 within the architecture 10 can directly access data in any node memory 14, by performing a DMA transfer to get the data.

In the implemented embodiment of the architecture 10, each network interface 15 and node memory 14 pair can sustain an 8 MByte per second DMA transfer rate, providing a 64 MByte per second aggregate node memory bandwidth in an eight node architecture 10. Since each node 11 has its own local memory 14, DMA transfers take place concurrently with other processing tasks. The executive program maintains data in the node 11 where the data is used, whenever possible. The result is that in a typical application, more than half of the accesses to node memory 14 are local to a node 11.

Each control processor module 12 includes internal ROM containing startup, built-in test, and run-time executive software. On startup, the control processors 12 perform self tests, then tests of the node 11, then collectively bring up the working portions of the architecture 10 in a fault-tolerant manner. At least one of the nodes 11 includes overall system startup capability, such as a ROM module 14 in an embedded system, a disk drive and disk controller 16 in a stand-alone system, or an Ethernet interconnect 16. This is used to load application programs and control program execution.

The architecture 10 provides application programmability through two different methods, using data flow or control flow programs. The architecture 10 provides support for executing Navy-standard processing graph methodology. This allows applications to be represented through data flow graphs, with interface and control of processing provided by command programs. The architecture 10 also allows applications to be programmed directly using conventional languages, such as FORTRAN or C. Programs are developed on a host computer, then compiled, linked, downloaded and executed on the control processors 12. These two methods allow application programs to directly invoke signal processing primitives in the arithmetic processors 13, or to invoke data flow graphs that the executive program interprets to automatically sequence the execution of signal processing primitives.

The processing node 11 utilizes a standard VME bus architecture to allow increased performance and flexibility through the addition of new processor, memory, and interface modules. The architecture 10 may be tailored to a specific application by inserting standard or customized interface modules into available circuit card slots in each processing node 11, illustrated by means of the dashed boxes behind the special purpose module 16.

The control processor 12 manages the node memory 14 local to the node 11, controls the network interface 15, and executes the application command program. The current control processor 12, a commercially available module, includes a Motorola 68020 central processing unit, a 68881 math coprocessor for enhanced scalar processing, and 1 MByte of zero wait-state SRAM. It is available in speeds from 12.5 MHz through 25 MHz, and is typically run at 16.7 MHz. A node 11 may be configured with multiple control processors 12 where extra scalar or control processing is required. Higher performance modules, such as a RISC chip-based processor, may also be employed.

The arithmetic processor 13 executes the signal processing primitive functions. While any VME-compatible arithmetic processor 13 may be used, in the reduced-to-practice implementation of the architecture 10, a VLSI signal processor (VSP) manufactured by Hughes Aircraft Company is used as the arithmetic processor 13 because of its programmability and high throughput. This unique signal processor architecture is described in detail in U.S. Pat. No. 5,187,795, entitled "Pipelined Signal Processor having a Plurality of Bidirectional Configurable Parallel Ports", issued Feb. 16, 1993. The single circuit card VSP can perform 60 MFLOPS on 32-bit IEEE floating point data or 150 MOPS on 16-bit fixed point data. Each VSP has 1 MByte of high-speed SRAM for local storage of data. A node 11 may be configured with up to fifteen arithmetic processors 13 where extra vector processing is required, as long as the total number of arithmetic processors 13 and network interfaces 15 in a modular array processor 10 does not exceed sixteen.

The network interface 15 buffers the data transferred over the buses 17, 18, and 21 in four FIFOs and controls the DMA transfers to and from the node memory 14. Because each of the arithmetic processors 13 has dedicated local memories, DMA transfers to the node memory 14 can be done concurrently with other processing. The node memory 14 is a large capacity dynamic RAM module used to store intermediate data and results. The VSB bus 19a provides the control processor 12 with high-speed, direct access to the node memory 14. The standard node memory 14 has 4 MByte of memory capacity expandable to 16 MByte. Multiple node memories 14 may be installed in a node 11 where more memory capacity is necessary.

Figure 2:
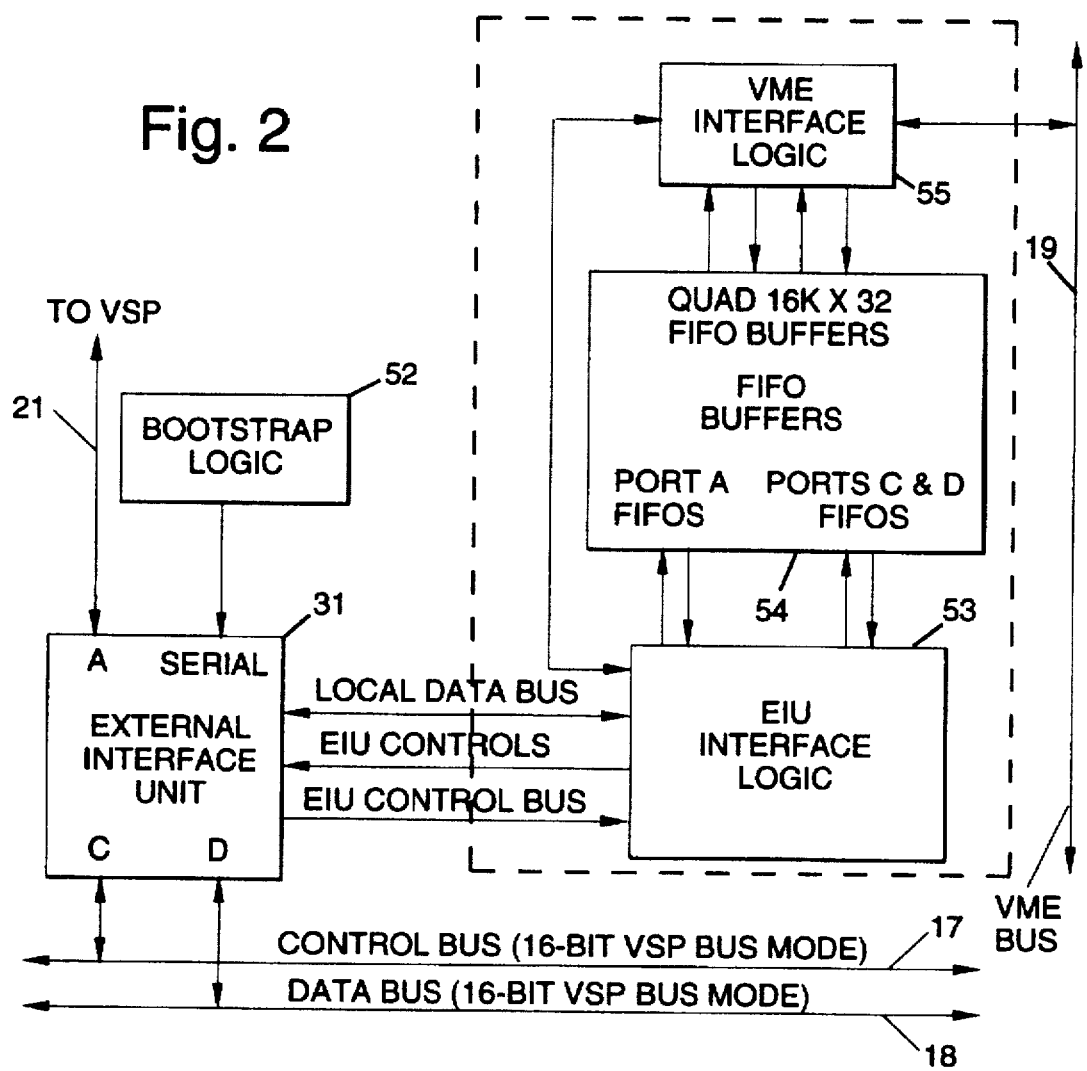
FIG. 2 illustrates a block diagram of a network interface module employed in the modular array processor of FIG. 1.

Referring to FIG. 2, the network interface is the key to implementing the modular array processor architecture. While the arithmetic processors 13 and the control and data buses 17, 18 operate with the high performance VSP bus mode protocol, the control processors 12 and bulk memory 14 operate according to standard VME and VSB protocols. The network interface serves as the gateway between these two protocols. Using an external interface unit (EIU) chip 31 that has the same design used in the VSP and operates according to the VSP bus mode protocol, it buffers the data transferred over the VSP-protocol buses 17, 18, 21 in four 16K×32-bit FIFOs 54 and coordinates the DMA transfers to and from the VME bus 19. Working independently of the control processors 12 and the arithmetic processors 13, DMA transfers are done concurrently with other processing.

The external interface unit chip 31 contains a serial control port and four 16-bit bidirectional data transfer ports (A, B, C, D). The serial data port is used to configure the EIU chip 31 under control of fixed bootstrap logic 52. Ports A and B talk directly to the VSP bus 21, port C to the control bus 17, and port D to the data bus 18. The EIU chip talks through interface logic 53 to four FIFO buffers 54. The FIFO buffers allow packets of data to be transferred to and from the VME bus 19 in DMA bursts through the VME interface logic 55.

As is shown in FIG. 1, this powerful interface between VME and VSP protocols allows data to be routed between VSPs within a node over the bus 21, across the nodes 11 over the buses 17, 18, and to bulk memory within a node 11 or to other nodes 11 within the architecture 10, all independent of processing going on within the node 11. Such flexibility in the movement of data is essential in implementing the adaptive load balancing mechanisms.

Figure 3:
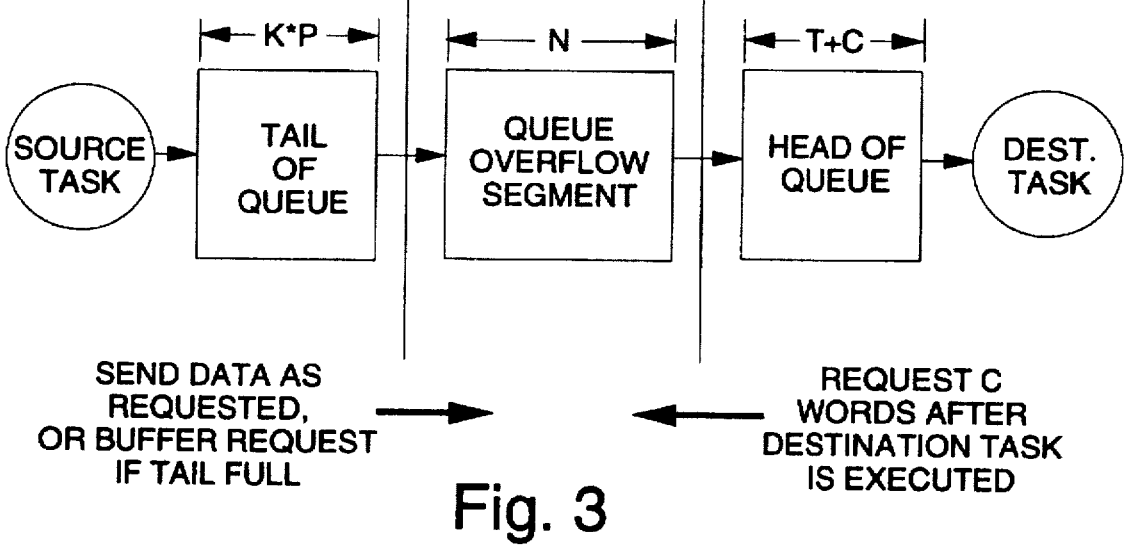
FIG. 3 illustrates the structure of segmented queues as they are employed in the architecture of FIG. 1.

Referring to FIG. 3, queues are segmented to optimize performance of the arithmetic processors 13 and utilization of their local data memories. As an arithmetic processor 13 produces data, in batches of size P, some small multiple of P is stored within the originating processor 13. This is referred to as the tail of the queue. At the same time, direct I/O is requested with the processor attached to the head of the queue, where sufficient data is stored for a single execution of the receiving task, as determined by the consume amount C and the threshold T. If space is available, the transfer occurs directly. If the destination buffer is full, the destination's control processor 12 intervenes, providing space in its bulk memory 14 to buffer the data, and rerouting the I/O request to transfer the data directly from the source arithmetic processor 13 to the destination bulk memory 14. The overflow segment is chained to the head segment, so that it becomes the source of data to the destination arithmetic processor 13 when its own buffer empties. As tasks are moved dynamically, this segmentation expands to include additional bulk memories, with chaining pointers keeping track of the proper order to read the data without unnecessary copying of buffers.

Figure 4:
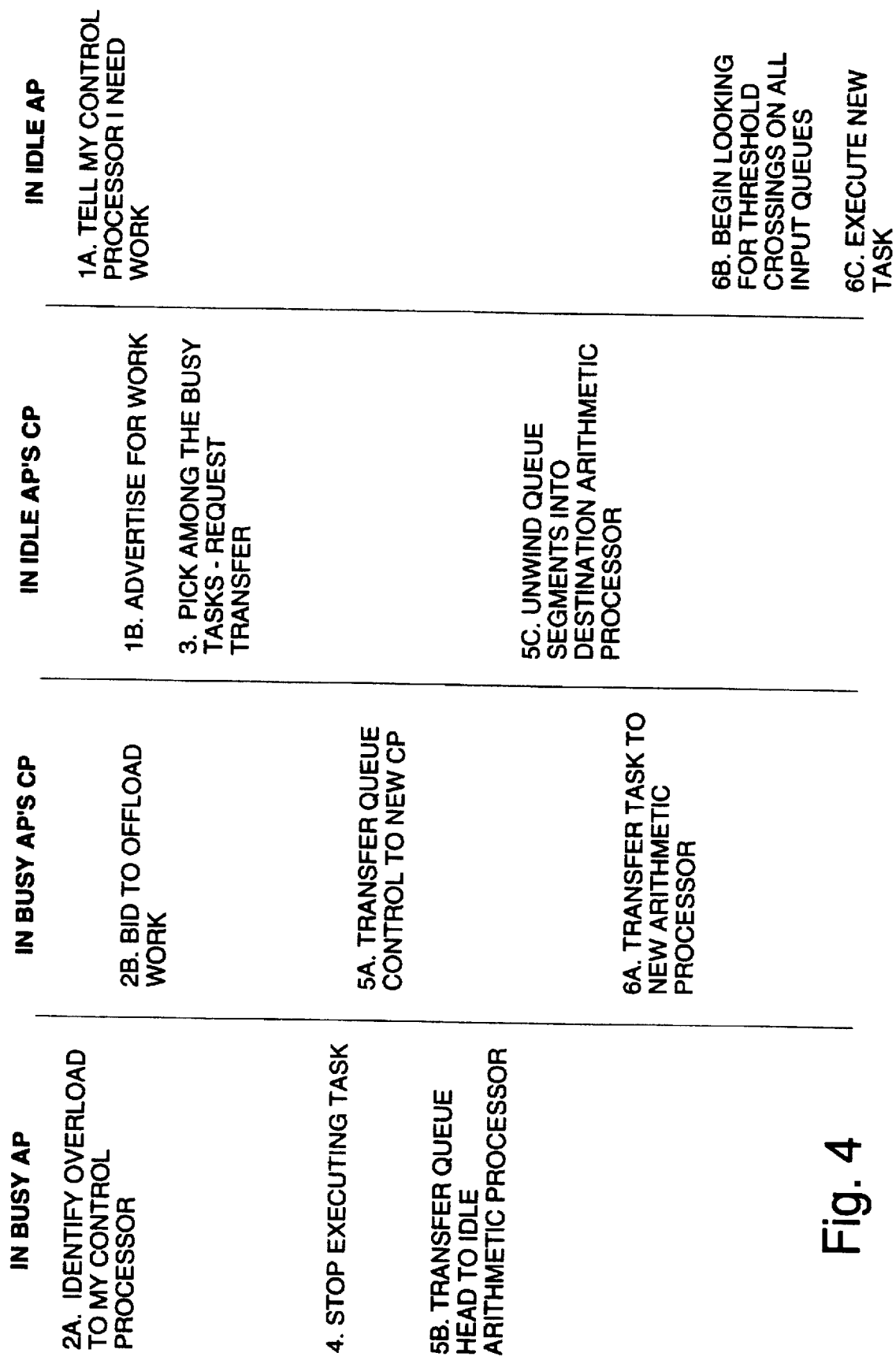
FIG. 4 shows a flow diagram of the heuristic scheduler employed in the architecture of FIG. 1.

Referring to FIG. 4, adaptive load balancing is done asynchronously throughout the architecture 10 of FIG. 1. In FIG. 4, time flows downward, and all processors communicate by standard messages. Each processor 13 has a shell or executive program that cooperates with all the other shell programs to balance the processing load. As arithmetic processors 13 (AP) find themselves without work (step 1A), they ask their own control processor 12 (CP) to find them additional tasks. The control processor 13 then advertises for tasks (step 1B). Similarly, as arithmetic processors 13 detect that they have more work than they can process, they ask their control processor 13 to give work away (step 2A). The control processors 12 then offer tasks for offload (step 2B). The actual negotiation of task transfers, and the decisions as to what task transfers are optimum, are made by the control processors 12 collectively (step 3) over the control bus according to heuristic weightings that consider the connectivity between tasks, the data memory space available, and the affinity of each processor type to the candidate tasks.

When two control processors 12 determine that a transfer should take place, they move responsibility for the task to the new processor (steps 4, 5A, and 6A), redirect input queue heads into the new arithmetic processor (step 5B), and redirect queue segment chaining to route data appropriately to the new destination (step 5C) over the data bus 17, 18. The destination processor 13 then begins to look for sufficient input data (step 6B) and executes the task when data is available (step 6C).

The adaptive node scheduling system takes advantage of the cyclic nature of signal processing applications to achieve the performance of a dynamic data flow architecture with an overhead closer to that of a statically-oriented processing system. Processing tasks are distributed by node group at start time. During run time, the architecture dynamically adapts itself to provide optimum time-line balancing. The architecture is much more flexible than conventional statically allocated architectures but does not require the enormous resources for scheduling and memory management of the conventional dynamically allocated system.

The modular, expandable capability of the modular array processor architecture 10 makes it adaptable for use in a broad range of signal processing applications throughout the military and commercial arenas. The incorporation of the standard VME bus and VME physical card format provides users the opportunity to configure a system to fit specific requirements. The number of processing nodes, the number of processors per node, expandable memory, the tailoring of I/O, and other modular features make the modular array processor architecture 10 applicable for a wide variety of applications.

Thus there has been described a modular array processor architecture that provides for distributed parallel processing and that comprises multiple parallel processing nodes having access to a distributed global memory by way of multiple buses. It is to be understood that the above-described embodiment is merely illustrative of some of the many specific embodiments that represent applications of the principles of the present invention. Clearly, numerous other arrangements can be readily devised by those skilled in the art without departing from the scope of the invention.

What is claimed is:

1. An expandable modular array processor architecture comprising:

a plurality of processing nodes, wherein at least one of said plurality of processing nodes is operable to perform system startup and, wherein each processing node comprises:

an arithmetic processor having an input/output port for high speed receiving of data or transmitting of data from an external source that is to be processed, and dedicated local memories, said arithmetic processor further operable to execute signal processing primitive functions;

a control processor for controlling processing activity for all processors contained in the plurality of processing nodes and reallocate tasks assigned for processing in its node to available processors in other nodes based on a predetermined set of rules that are implemented by means of a heuristic task scheduling program, said control processors operable upon system startup to perform self tests and then tests of said processing nodes;

a large capacity node memory that also comprises a portion of a distributed global memory, said large capacity node memory operable to store intermediate data and results; and a network interface coupled between the control processor, the arithmetic processor and the node memory;

a data bus coupled between respective arithmetic processors and network interfaces of each of the plurality of processing nodes; and a control bus coupled between the respective arithmetic processors and network interfaces of each of the plurality of processing nodes;

wherein respective network interfaces link the respective arithmetic processors, node memories and control processors together to provide for communication therebetween and permit each node to communicate with respective node memories of all other processing nodes to provide for load balancing therebetween, and to buffer data transferred over the data and control buses to a respective node, and to operate as high-speed DMA controllers to transfer data between the arithmetic processor and node memory of a processing node independent of the control processor in that node.

2. The module array processor architecture of claim 1 wherein data is segmented among various processors in a manner that minimizes data copying and allows data operations in source and destination processors to be done locally.

3. The module array processor architecture of claim 1 wherein the control bus keeps track of available processors of the architecture under control of a heuristic scheduler for reallocating tasks to available processors based on a set of heuristic rules, and wherein the data bus is used to transfer data between the node memories so that reallocated tasks are performed by selected arithmetic and control processors using data that is stored locally.

4. The modular array processor architecture of claim 1 comprising a multiple-instruction, multiple-data (MIMD) architecture, having multiple scalar and vector processors interconnected with a distributed global memory.

5. The modular array processor architecture of claim 1 wherein each processing node comprises a plurality of arithmetic processors and a plurality of control processors.

6. The modular array processor architecture of claim 1 wherein the data bus comprises a VME bus.

7. The modular array processor architecture of claim 1 wherein the network interfaces operate as high-speed DMA controllers to transfer data between the arithmetic processor and node memory of a processing node independent of the operation of the control processor in that node.

* * * * *